US012040117B2

(12) United States Patent
Gonçalves Mendes et al.

(10) Patent No.: US 12,040,117 B2
(45) Date of Patent: Jul. 16, 2024

(54) TANK FOR TRANSFORMER AND TRANSFORMER THEREOF

(71) Applicants: EFACEC ENERGIA, MÁQUINAS E EQUIPAMENTOS ELÉCTRICOS, S.A., Matosinhos (PT); UNIVERSIDADE DO MINHO, Braga (PT)

(72) Inventors: Hélder Fernando Gonçalves Mendes, Guardeiras (PT); Agostinho Emanuel Nunes Martins De Matos, Guardeiras (PT); Antonio Carlos Costa Marques Pinho, Guardeiras (PT); Carin Celisse Della Rosa, Guardeiras (PT); Carlos Manuel Martins Carvalho, Guardeiras (PT); Cassiano Da Costa Linhares, Guardeiras (PT); João Viana Coutinho De Oliveira Figueiredo, Guardeiras (PT); Joel Ricardo Da Silva Teixeira, Guardeiras (PT); Jose Antonio Bizarro Meireles, Guardeiras (PT); José Pedro Fernandes Proença Ferreira, Guardeiras (PT); Luís Miguel Ribeiro Félix, Guardeiras (PT); Marco Jorge Sampaio Teixeira, Guardeiras (PT); Ricardo Alexandre Fernandes De Castro Lopes, Guardeiras (PT); Tiago Ramos Lima, Guardeiras (PT)

(73) Assignees: EFACEC ENERGIA, MÁQUINAS E EQUIPAMENTOS ELÉCTRICOS, S.A., Matosinhos (PT); UNIVERSIDADE DO MINHO, Braga (PT)

( * ) Notice: Subject to any disclaimer, the term of this patent is extended or adjusted under 35 U.S.C. 154(b) by 551 days.

(21) Appl. No.: 16/651,801

(22) PCT Filed: Sep. 27, 2018

(86) PCT No.: PCT/IB2018/057513
§ 371 (c)(1),
(2) Date: Mar. 27, 2020

(87) PCT Pub. No.: WO2019/064230
PCT Pub. Date: Apr. 4, 2019

(65) Prior Publication Data

US 2020/0251269 A1 Aug. 6, 2020

(30) Foreign Application Priority Data

Sep. 27, 2017 (PT) ........................................ 110310

(51) Int. Cl.
*H01F 27/02* (2006.01)

(52) U.S. Cl.
CPC .................................... *H01F 27/02* (2013.01)

(58) Field of Classification Search
CPC ................................................ H01F 27/02–46
See application file for complete search history.

(56) References Cited

U.S. PATENT DOCUMENTS 3,082,391 A * 3/1963 Chiki .................... H01F 27/245 336/59
4,469,269 A 9/1984 Ito et al.
(Continued)

FOREIGN PATENT DOCUMENTS

FR 3 001 830 8/2014
JP 58053810 A * 3/1983 ............. H01F 27/02
JP 61135104 A * 6/1986 ............. H01F 27/02

*Primary Examiner* — Tuyen T Nguyen
(74) *Attorney, Agent, or Firm* — Leason Ellis LLP

(57) ABSTRACT

Tank for electrical transformer comprising a bottom plate, two side panels and two end panels joined to contain an insulating fluid, and reinforcements joined to the exterior of said panels, wherein the two side panels and the two end panels are vertically curving convex panels, wherein the reinforcements comprise a plurality of arched vertical reinforcements distributed horizontally along each panel. The reinforcements may comprise a plurality of bracing horizontal reinforcements joined between said vertical reinforcements. The inner arching profile of the vertical reinforcements preferably matches the outer curving convex profile of the panels. The horizontal reinforcements are
(Continued)

preferably planar. The horizontal reinforcements are preferably located at a horizontal plane in the vertical middle of the respective panel. The horizontal reinforcements are preferably located at a middle horizontal plane or at parallel horizontal planes distributed vertically. The vertical reinforcements preferably extend substantially to the full height of the respective panel.

12 Claims, 6 Drawing Sheets

(56) References Cited

U.S. PATENT DOCUMENTS

| | | | | |
|---|---|---|---|---|
| 4,492,314 | A * | 1/1985 | Avery | H01F 27/02 220/646 |
| 4,834,257 | A * | 5/1989 | Book | H01F 27/02 165/104.33 |
| 5,508,672 | A * | 4/1996 | Sokai | H01F 27/322 336/60 |
| 5,527,988 | A | 6/1996 | Hernandez et al. | |
| 7,663,461 | B2 * | 2/2010 | Brosig-Rodriguez | H01F 27/02 174/50 |
| 2011/0273255 | A1 | 11/2011 | Thompson | |
| 2015/0091682 | A1 * | 4/2015 | Quintero Restrepo | H01F 27/02 336/94 |

* cited by examiner

TANK FOR TRANSFORMER AND TRANSFORMER THEREOF

CROSS-REFERENCE TO RELATED PATENT APPLICATIONS

This application is a U.S. National Phase Application under 35 U.S.C. § 371 of International Patent Application No. PCT/IB2018/057513, filed Sep. 27, 2018, which claims the priority of Portugese Patent Application No. 110310, filed Sep. 27, 2017, all of which are incorporated by reference, as if expressly set forth in their respective entireties herein.

TECHNICAL FIELD

The present disclosure relates to transformer tank construction, in particular a tank for transformer and respective transformer and tank. In particular, the disclosed tanks are resistant to negative pressures resulting from vacuum drying, and positive pressures from manometric oil pressure, short-circuit and internal electric arc faults.

BACKGROUND

Power transformers can be re-engineered to reduce costs through mass savings and improved manufacturability. It is common practice in the art to have tanks with a prismatic shape and planar reinforcements. Welded structural reinforcements can be used to increase wall strength with limited impact on tank weight.

Transformers, particularly those of power, contain a fluid (gas or liquid) to improve refrigeration and insulation of the equipment. A sealed tank is necessary to ensure that the electrical components, such as the magnetic circuit and the coils that form the active part, remain immersed in the fluid.

Due to the manufacturing and testing requirements and subsequent use of the equipment, a transformer tank can therefore be described as a reservoir designed to withstand both negative and positive pressures. Typically, negative pressures are due to vacuum drying, where it is necessary to ensure the required level of insulation is achieved to guarantee the tank performance is not impeded when high electrical voltage values occur. Conversely, positive pressures come from the manometric column of the oil and gases inside the transformer, but the critical cases are related to the short-circuit pressures and internal electric arcs phenomena that occur in the service life of the equipment.

Generally, the overpressure values are about 0.6 kgf/cm2 while the vacuum pressure is about 1 kgf/cm2, relative to atmospheric pressure. Consequently, the vacuum pressure value is normally used as the design criteria.

As stated previously, conventional tanks may employ external bracing, like welded structural reinforcements, to ensure the tank can withstand the negative/positive pressures. The predominantly box shape of the prior art tanks, for example as in patent document FR3001830A1, is disadvantageous when the tanks undergo the loading described previously.

These facts are disclosed in order to illustrate the technical problem addressed by the present disclosure.

General Description

One of the aims of the present disclosure was to change the profile of the tank to a shape which is inherently stronger than the conventional planar geometry. The desirable shape adds stability and allows the tank to accommodate pressure increases/decreases while substantially reducing the mass of the tank. This has positive impacts on cost particularly through manufacturing and transportation.

It is disclosed a tank for housing electro-magnetic systems, designed with external reinforcements to prevent collapse or rupture under a range of positive and negative pressures. The welded vessel comprises of vertically curving end walls and vertically curving side walls with a plurality of vertically curving vertical reinforcements and horizontal reinforcements. The walls used in said tanks are usually metallic panels. The profiles of the reinforcements may vary in response to structural specifications and logistical requirements. The cover is secured to a top border of the welded structure. The disclosure has advantages which include the reduction of panel displacements due to positive or negative pressures; higher panel displacements are tolerated compared to prior art tanks; reduction in the number of reinforcements applied when compared to a conventional tank used for the equivalent task; reduction of the total mass of the tank (approximately 35% compared to a prior art tank); a large percentage of the structure can be obtained from sheet metal, improving the raw material stock processes and manufacturing; the disclosed reinforcements do not infringe on internal sections of the tank; the tank overall shape is particularly suited to electromagnetic circuits that are bound by an outer rectangular parallelepiped shape.

It is disclosed a tank for electrical transformer comprising a bottom plate, two side panels and two end panels joined to contain an insulating fluid, and reinforcements joined to the exterior of said panels,

- wherein the two side panels and the two end panels are vertically curving convex panels,
- wherein the reinforcements comprise a plurality of arched vertical reinforcements distributed horizontally along each panel.

Preferably, but not necessarily, the plurality of arched vertical reinforcements are distributed horizontally along each panel at equal distances between said vertical reinforcements.

An embodiment comprises a plurality of bracing horizontal reinforcements joined between said vertical reinforcements.

In an embodiment, the inner arching profile of the vertical reinforcements matches the outer curving convex profile of the panels.

In an embodiment, the horizontal reinforcements include corner horizontal reinforcements bracing two vertical reinforcements each from a respective end and side panel.

In an embodiment, the horizontal reinforcements are planar.

In an embodiment, the horizontal reinforcements are located at:

- a horizontal plane in the vertical middle of the respective panel, or
- parallel horizontal planes distributed vertically along the respective panel.

In an embodiment, the vertical reinforcements extend substantially to the full height of the respective panel.

In an embodiment, the panels have a curvature which has a centre at the vertical middle of the respective panel, i.e. the vertex (or 'tip' of the curvature) is located in the vertical middle of the respective panel.

In an embodiment, the vertical reinforcements have a curvature that is circular, parabolic or catenary.

In an embodiment, the reinforcements are comprised of plate beams, U-shaped beams, I-shaped beams, or combinations thereof.

In an embodiment, the panels and reinforcements are formed from sheet metal.

In an embodiment, the reinforcements are joined to the exterior of said panels by welding.

In an embodiment, the reinforcements are joined to the exterior of said panels by fillet welding.

It is also disclosed an electrical transformer comprising an electromagnetic circuit and a tank according to any of the disclosed embodiments.

An embodiment comprises a cover secured to a top border of the tank.

In an embodiment, the cover is convex.

In an embodiment, the cover is a panel comprising a plurality of planar sheets formed from a longitudinally bent metal sheet or formed from a plurality of planar sheets welded longitudinally together.

In an embodiment, the transformer is a core transformer or shell transformer.

BRIEF DESCRIPTION OF THE DRAWINGS

The following figures provide preferred embodiments for illustrating the description and should not be seen as limiting the scope of invention.

DETAILED DESCRIPTION

Figure 1:
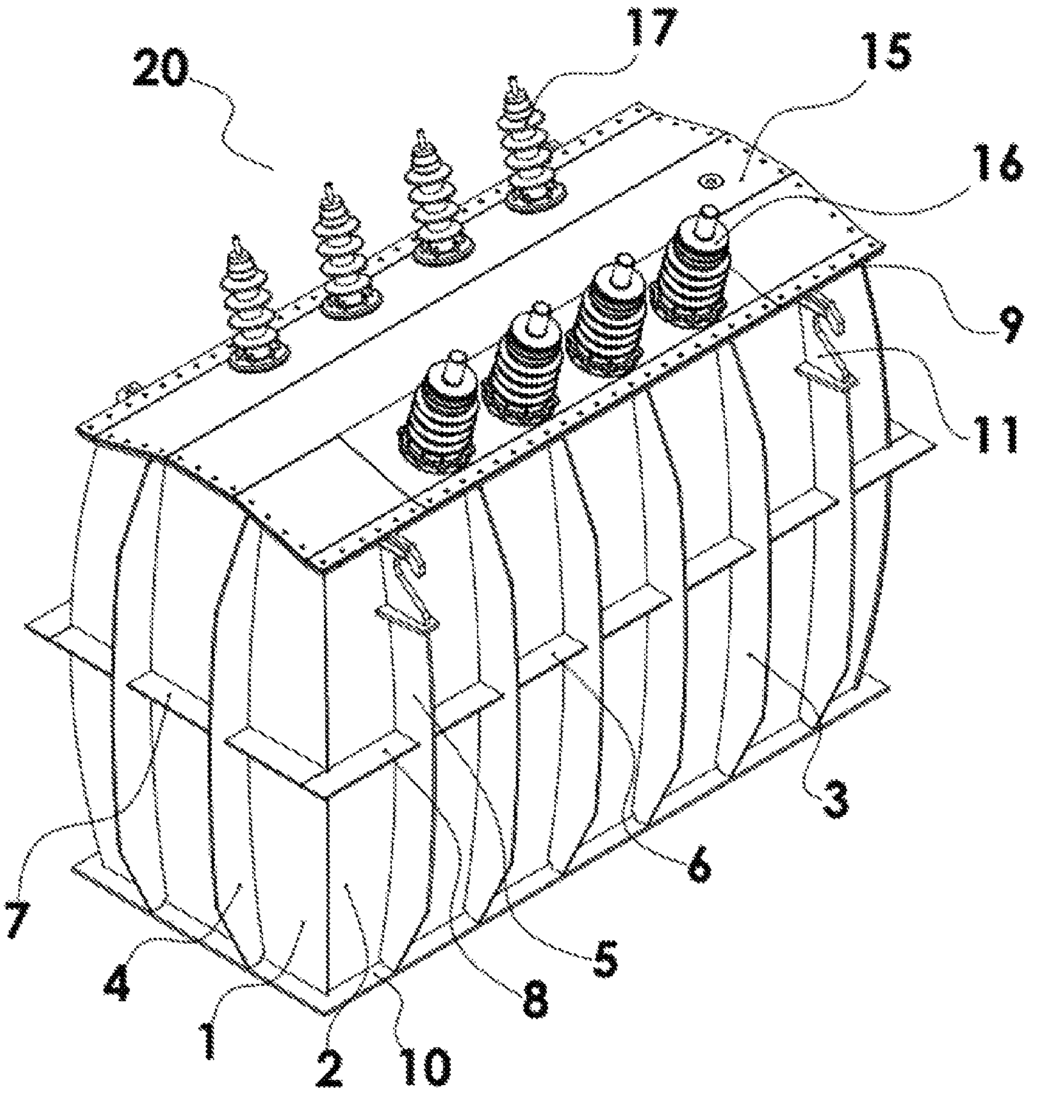
FIG. 1 is a schematic representation of an isometric view of an embodiment of the disclosed transformer tank.

The present disclosure is also further described, in particular, using embodiments of the disclosure. Therefore, the disclosure is not limited to the descriptions and illustrations provided. These are used so that the disclosure is sufficiently detailed and comprehensive. Moreover, the intention of the drawings is for illustrative purposes and not for the purpose of limitation.

It is disclosed a tank 20 for housing electro-magnetic systems, designed with external reinforcements to prevent collapse or rupture under a range of positive and negative pressures. The welded vessel comprises of vertically curving end 1 and vertically curving side 2 walls (or interchangeably, panels) with a plurality of vertically curving vertical reinforcements 3, 4, 5 and horizontal reinforcements 6, 7, 8, in particular horizontal corner reinforcements 8. The profiles of the reinforcements may vary in response to structural specifications and logistical requirements. The cover 15 is secured to a top border 9 of the welded structure. The cover may be comprised of a plurality of planar sheets that are bound (e.g. welded) longitudinally at an angle, in particular being obtained from a same metal sheet that may subsequently be bent into a plurality of planar sheets, forming a convex cover for the transformer.

FIG. 1 is a schematic representation of an isometric view of an embodiment of a transformer tank following the present disclosure. The tank allows electrical components such as the coils 12, the magnetic circuit 13 shown in FIG. 3 to remain submerged in the fluid.

FIG. 1 shows a schematic representation of a typical tank topology, however the solution is applicable to any shape of tank.

Figure 2:
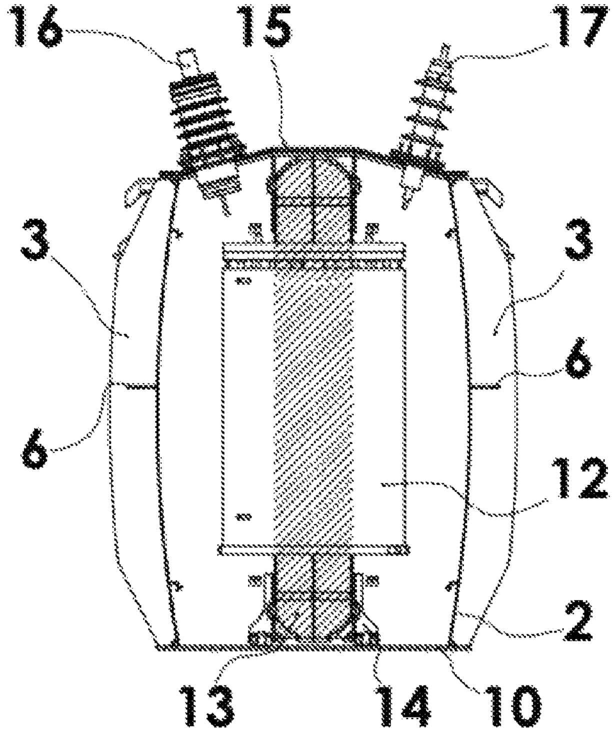
FIG. 2 is a schematic representation of a front cross-sectional view of an embodiment of the disclosed transformer tank illustrating the curved profile of the panel and reinforcement. Additionally, the active part and ancillary components inside the vessel can also be viewed.

The embodiment of FIG. 1 includes two end panels 1 and two side panels 2 which preferably have the same radius of curvature between the bottom plate 10 and the edge of the cover, at the top border 9, thus defining a vertically curved convex profile as shown in FIG. 1 and FIG. 2.

A more curved panel wastes space inside the tank as the electromagnetic circuit to be contained is usually bound by an outer parallelepiped shape. A less curved panel will not attract the disclosed advantages of robustness and lightness.

Figure 5:
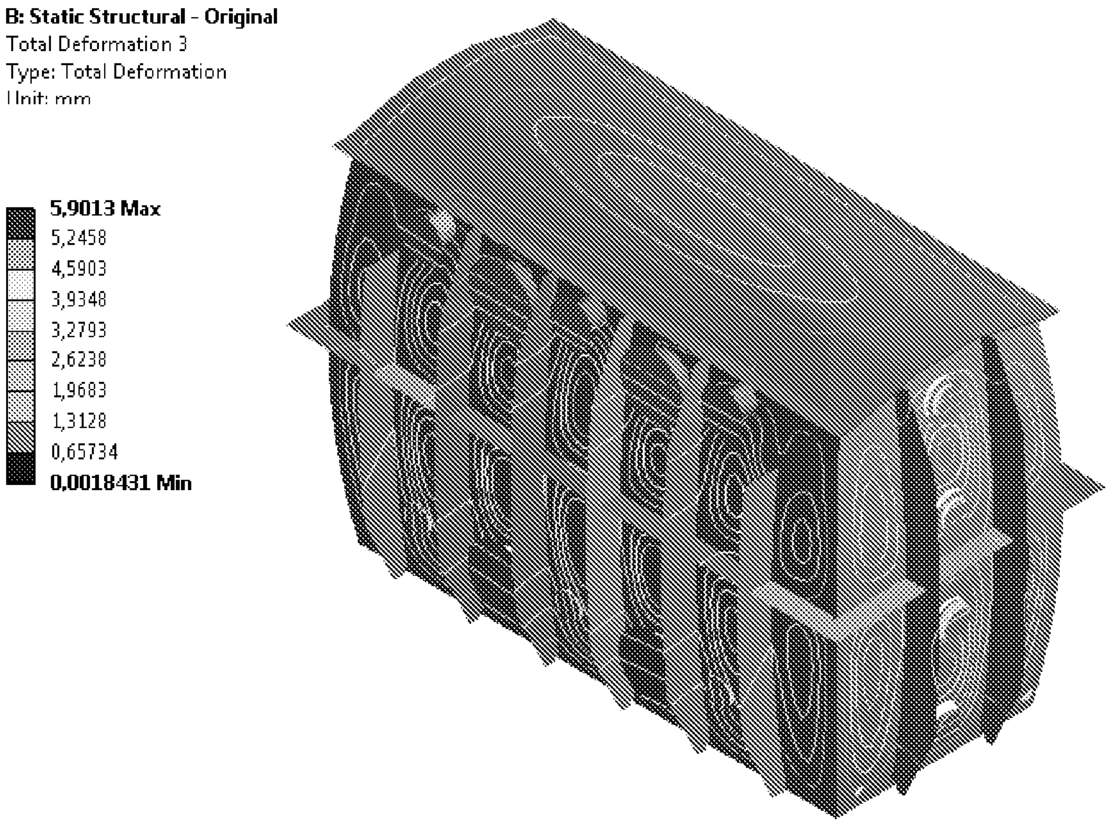
FIG. 5 illustrates the results of Finite Element Analysis of an embodiment of the disclosed transformer tank.
Figure 6:
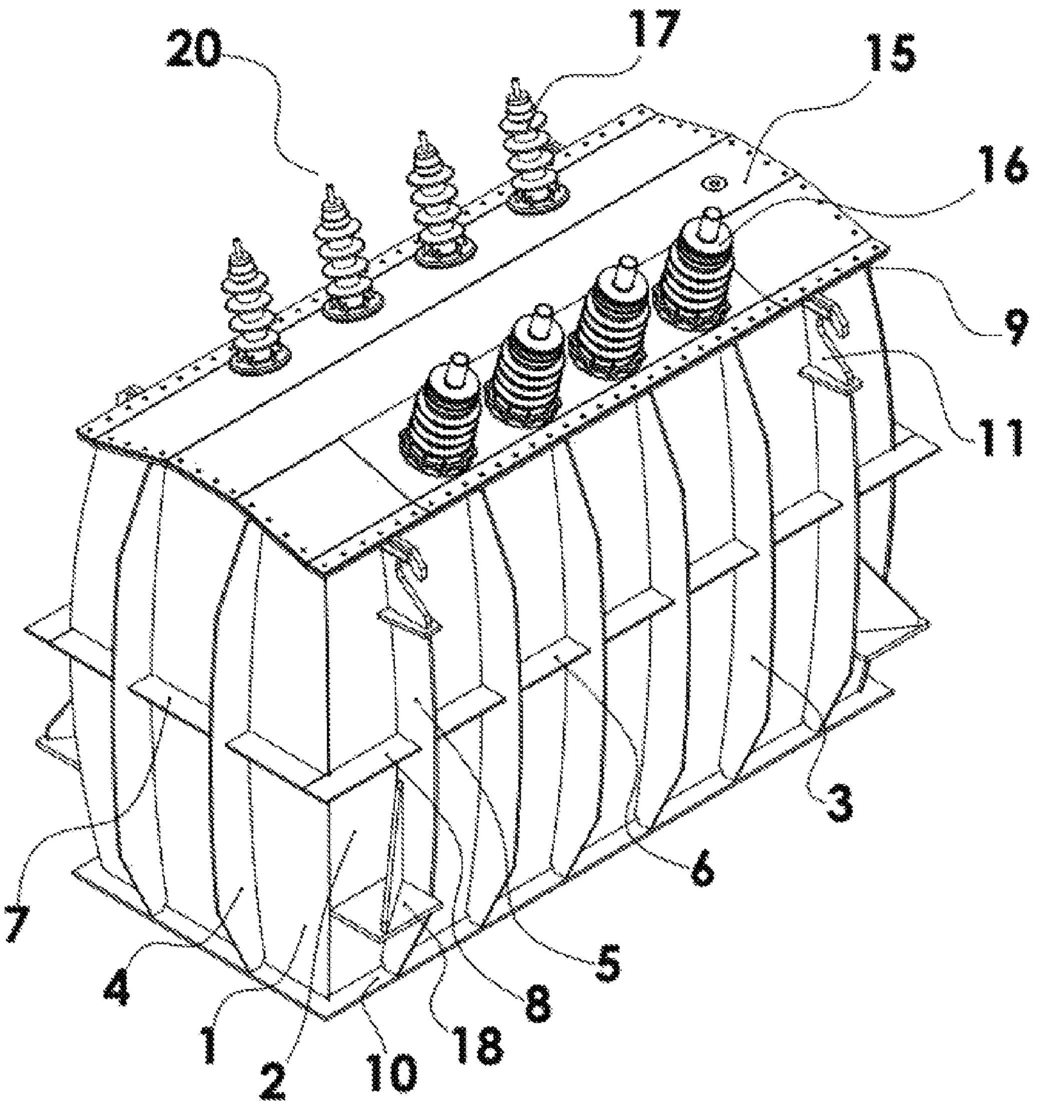
FIG. 6 illustrates an alternative embodiment with jacking pads for lifting of the disclosed transformer tank.

A combination of a more curved tank and less curved tank will not attract the disclosed advantages of robustness and lightness as panel strength of the less curved profile requires additional supports as shown in FIG. 5.

The edges at the bottom and on top of the panels 1, 2 are flat. The laterally forming edges are cut according to a curved profile to permit a cohesive assembly to the adjacent panel, such that the vertically curved convex panels match the respective joining panels at the tank corners.

The end panels 1 and side panels 2 are joined to the bottom plate 10 and to a top border 9.

The union between panels 1, 2 is preferably made by a fillet welding. Preparation grooves may be used, but are not necessary for most embodiments.

The centre of the curvature is preferably located halfway up the side panels 2.

The vertical reinforcements of the side panels 3, vertical reinforcements of the lifting lug 5 and the vertical reinforcements of the end panels 4 preferably have the same inner curvature.

Figure 4:
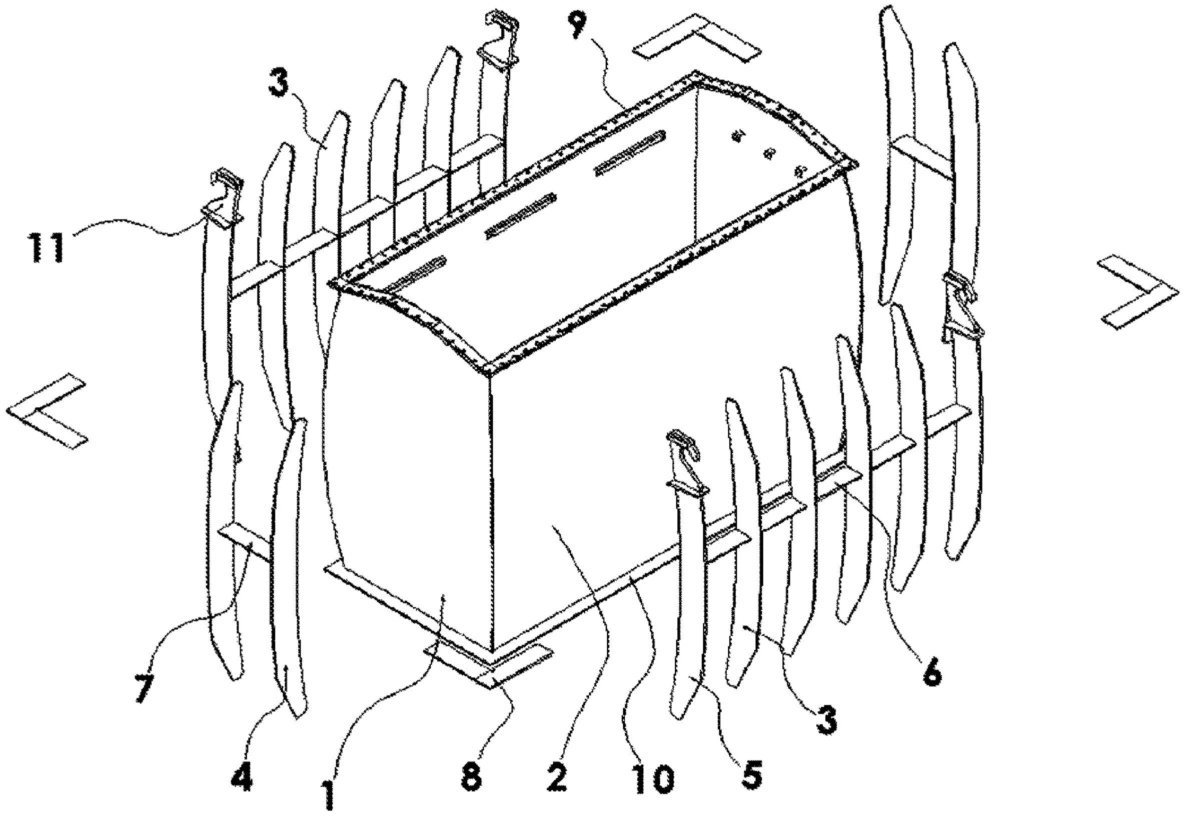
FIG. 4 is a schematic representation of an exploded view of an embodiment of the disclosed transformer tank illustrating the side, end and corner reinforcements.

The vertical reinforcement 3, 4, 5 as shown in FIG. 4 have rectangular cross-sections, however other sections can be used, such as "U shape" or "I beam". For example, the reinforcement plates may be extruded and bent to the desired shape and these reinforcements may then be welded to the structure—thus, preformed and then installed.

The horizontal reinforcements 6, 7, 8 improve the stability of the vertical reinforcements, by providing lateral restraints to the vertical reinforcements, resulting in increased slenderness reducing the risk of buckling.

The horizontal reinforcement 6, 7, 8 as shown in FIG. 4 have rectangular cross-sections, however other sections can be used, such as "U shape" or "I beam".

The positioning, plurality or distance between the end vertical reinforcements 4 or the side vertical reinforcements 3 will depend on the structural and logistical requirements of the equipment, which can be calculated within the usual and customary in the field. This may impact the number and placement of the horizontal reinforcements 6, 7, 8. The following are examples:

Normally, should the horizontal reinforcements 6, 7, 8 be positioned on one planar surface, then the optimum position is a horizontal plane at the centre of curvature of the side panels 2. The drawings illustrate this embodiment.

Alternatively, a plurality of the horizontal reinforcements 6, 7, 8 on parallel planes is also possible.

The shape of the horizontal reinforcements 6, 7, 8 is modifiable. For example, internal sections can be removed to reduce the amount of weld, for example by having non-contiguous welding to the panels combined with cut-out sections reducing weight and cost. The drawings are for illustration purposes.

The curvature of the panels 1, 2, the arched vertical reinforcements 3, 4, 5 and the bracing horizontal reinforcements 6, 7, 8 cooperate to allow the reduction of the thickness of the sheet used and therefore the total mass of the structure.

It could be seen, to put it simply, that the arched reinforcements work as bridges supporting and reinforcing the respective panels.

Components such as flanges, radiators, conservator tank, bushings 16, 17, lifting lugs 11, core support structure 14, among others, vary in positioning, geometry and topology depending on the characteristics of the equipment. The drawings illustrate an embodiment of these components.

Figure 3:
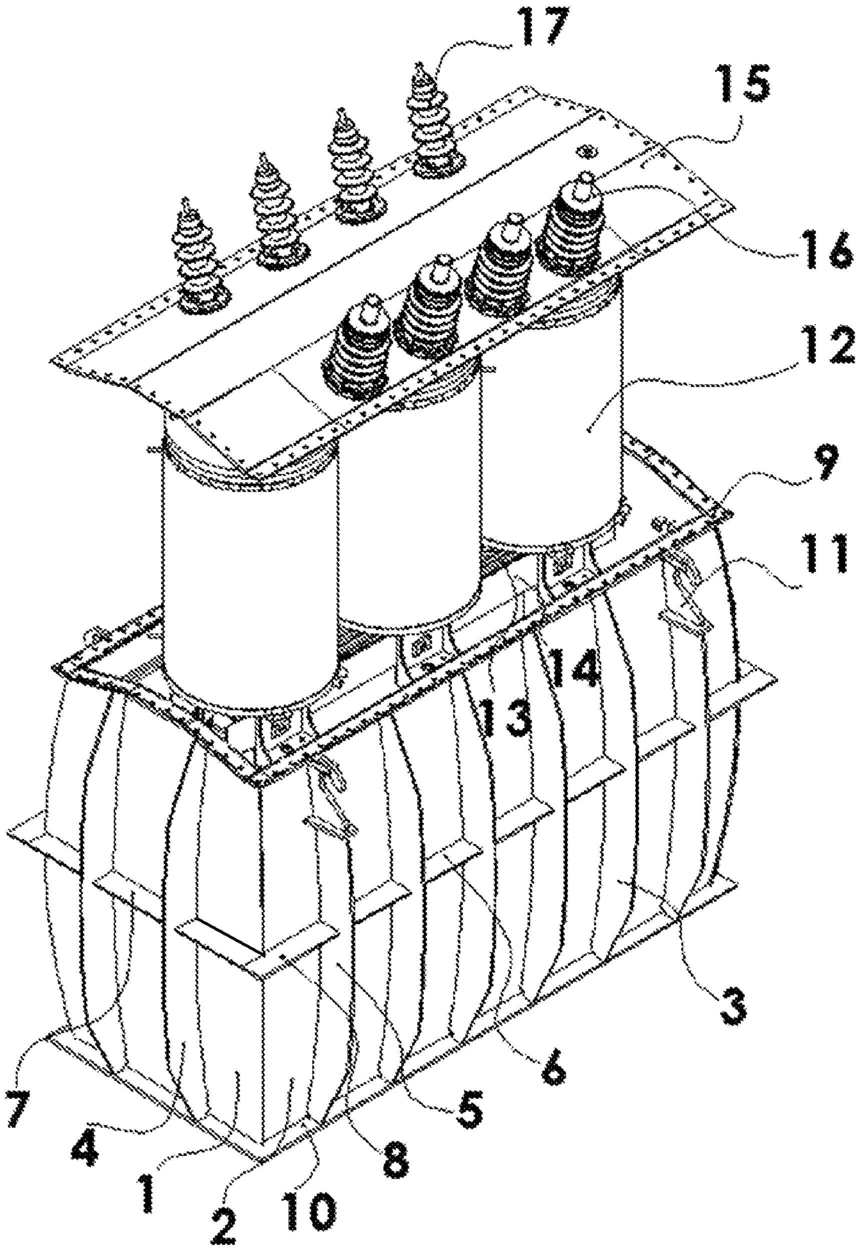
FIG. 3 is a schematic representation of an embodiment of the disclosed transformer tank, showing an exploded view of a transformer assembly, showing the active part, the tank and the cover.

The number of phases in FIG. 3 is merely indicative, with the number of phases depending on the actual equipment.

Other cover 15 geometries may be applied beyond the illustrated example, such as flat, multiple sloped and pitched variations.

Advantages include, but are not limited to the following:

- Reduction of panel displacements due to positive or negative pressures;
- Higher panel displacements are tolerated compared to prior art tanks;
- Reduction in the number of reinforcements applied when compared to a conventional tank used for the equivalent task;
- Reduction of the total mass of the tank (approximately 35% compared to a prior art tank);
- A large percentage of the structure can be obtained from sheet metal, improving the raw material stock processes and manufacturing;
- The disclosed reinforcements do not infringe on internal sections of the tank;
- The tank overall shape is particularly suited to electromagnetic circuits that are bound by an outer rectangular parallelepiped shape.

An embodiment comprises a transformer tank designed to withstand negative vacuum and positive pressure, comprising:

- 2 end panels (1) and 2 side panels (2) with a vertically curved profile between the edge of the cover (9) and the bottom plate (10);
- A set of vertical reinforcements (3, 4 and 5) with a vertically curved profile.
- Horizontal reinforcements (6, 7 and 8) attached to the vertically curved reinforcements (3, 4 and 5) and the panels (1 and 2).

An embodiment of the transformer tank encompasses the outer convex curved profile in which the centre of curvature is situated at half the height of the side panel (2).

An embodiment of the transformer tank comprises a vessel in which there is at least one magnetic circuit and a phase.

An embodiment of the transformer tank comprises:

- A watertight tank for containing the refrigeration and electric isolation fluid, composed of two end panels (1), two side panels (2), bottom plate (10), and cover (15);
- The reinforcements (3, 4, 5, 6, 7 and 8) are understood as components disposed in matrix form so as to reduce the deformations of the panels 1 and 2 which increase the rigidity and strength of the panels (1 and 2).

An embodiment of the cover of the tank is supported on the border (9).

An alternative embodiment comprises jacking pads (18) for lifting of the disclosed transformer tank.

The term "comprising" whenever used in this document is intended to indicate the presence of stated features, integers, steps, components, but not to preclude the presence or addition of one or more other features, integers, steps, components or groups thereof.

The disclosure should not be seen in any way restricted to the embodiments described and a person with ordinary skill in the art will foresee many possibilities to modifications thereof. The above described embodiments are combinable. The following claims further set out particular embodiments of the disclosure.

The invention claimed is:

1. A tank for an electrical transformer, comprising:

a bottom plate;

two side panels joined to the bottom plate, each of the two side panels defined by a convex curvature;

two end panels joined to the bottom plate and joined to the two side panels, each of the two end panels defined by a convex curvature;

a plurality of vertically oriented reinforcements, each of the vertically oriented reinforcements defined by an arch and distributed horizontally along an exterior side of a respective one of the two side panels or a respective one of the two end panels;

a first plurality of horizontally oriented bracing reinforcements, each of the first plurality of horizontally oriented bracing reinforcements positioned along an exterior side of a respective one of the two side panels or a respective one of the two end panels, and further positioned between two of the plurality of vertically oriented reinforcements; and a second plurality of horizontally oriented bracing reinforcements, each of the second plurality of horizontally oriented bracing reinforcements positioned along an exterior side of a respective one of the two side panels or a respective one of the two end panels, and further positioned adjacent to only one of the plurality of vertically oriented reinforcements, wherein the second plurality of horizontally oriented bracing reinforcements include corner reinforcements bracing two of the vertically oriented reinforcements, each from a respective end panel and adjacent side panel, and further wherein the joined bottom plate, two side panels, and two end panels are configured to contain an insulating fluid.

2. The tank according to claim 1, wherein the arch of each of the plurality of vertically oriented reinforcements matches the convex curvature of the two side panels and the two end panels.

3. The tank according to claim 1, wherein an outer profile of the plurality of vertically oriented reinforcements is an arching profile.

4. The tank according to claim 1, wherein the first plurality of horizontally oriented bracing reinforcements, the second plurality of horizontally oriented bracing, or both the first plurality of horizontally oriented bracing reinforcements and the second plurality of horizontally oriented bracing reinforcements are planar.

5. The tank according to claim 1, wherein the horizontally oriented bracing reinforcements are located at:

a horizontal plane in the vertical middle of a respective panel, or parallel horizontal planes distributed vertically along the respective panel.

6. The tank according to claim 1, wherein the plurality of vertically oriented reinforcements extend substantially to the full height of the respective panel.

7. The tank according to claim 1, wherein the panels have a curvature which has a centre at the vertical middle of the respective panel, in particular the curvature being circular, parabolic or a catenary.

8. The tank according to claim 1, wherein the panels and reinforcements are formed from sheet metal.

9. The tank according to claim 1, wherein the reinforcements are joined to the exterior of the panels by welding.

10. An electrical transformer comprising an electromagnetic circuit and a tank, wherein the tank comprises:

a bottom plate;

two side panels joined to the bottom plate, each of the two side panels defined by a convex curvature;

two end panels joined to the bottom plate and joined to the two side panels, each of the two end panels defined by a convex curvature; and a plurality of vertically oriented reinforcements, each of the vertically oriented reinforcements defined by an arch and distributed horizontally along an exterior side of a respective one of the two side panels or a respective one of the two end panels;

a first plurality of horizontally oriented bracing reinforcements, each of the first plurality of horizontally oriented bracing reinforcements positioned along an exterior side of a respective one of the two side panels or a respective one of the two end panels, and further positioned between two of the plurality of vertically oriented reinforcements; and a second plurality of horizontally oriented bracing reinforcements, each of the second plurality of horizontally oriented bracing reinforcements positioned along an exterior side of a respective one of the two side panels or a respective one of the two end panels, and further positioned adjacent to only one of the plurality of vertically oriented reinforcements, wherein the second plurality of horizontally oriented bracing reinforcements include corner reinforcements bracing two of the vertically oriented reinforcements, each from a respective end panel and adjacent side panel, wherein the joined bottom plate, two side panels, and two end panels are configured to contain an insulating fluid.

11. The electrical transformer according to claim 10, wherein the tank further comprises a convex cover secured to a top border of the tank.

12. The electrical transformer according to claim 10, wherein the electrical transformer is a core transformer or a shell transformer.

* * * * *